United States Patent

Nakagawa

Patent Number: 5,663,959
Date of Patent: Sep. 2, 1997

[54] ATM CELL SWITCHING APPARATUS HAVING A CONTROL CELL BYPASS ROUTE

[75] Inventor: Tatsuo Nakagawa, Tokyo, Japan

[73] Assignee: NEC Corporation, Tokyo, Japan

[21] Appl. No.: 573,038

[22] Filed: Dec. 15, 1995

[30] Foreign Application Priority Data

Dec. 15, 1994 [JP] Japan .................. 6-311472

[51] Int. Cl.$^6$ ........................... H04L 12/56
[52] U.S. Cl. ............ 370/395; 370/410; 370/528
[58] Field of Search ...................... 370/13, 14, 16, 370/68.1, 110.1, 111, 60, 60.1, 94.2, 395, 396, 398, 400, 410, 412, 389, 522, 528, 242, 244, 252; 371/20.2, 20.1, 20.4

[56] References Cited

U.S. PATENT DOCUMENTS

| | | | |
|---|---|---|---|
| 5,341,376 | 8/1994 | Yamashita | 370/94.2 |
| 5,440,565 | 8/1995 | Miyamoto et al. | 370/14 |
| 5,457,700 | 10/1995 | Merchant | 370/111 |
| 5,509,001 | 4/1996 | Tachibana et al. | 370/94.2 |
| 5,511,065 | 4/1996 | Yonehara | 370/111 |

FOREIGN PATENT DOCUMENTS

| | | |
|---|---|---|
| 2-224548 | 9/1990 | Japan . |
| 4-310033 | 11/1992 | Japan . |
| 5-48639 | 2/1993 | Japan . |

Primary Examiner—Douglas W. Olms
Assistant Examiner—Chau T. Nguyen
Attorney, Agent, or Firm—Young & Thompson

[57] ABSTRACT

An ATM cell switching apparatus which prevents degradation of user cells in the ATM switch and preserve the quality of control cells, even upon increase in the control cells. Control cell discriminator $2_1$ discriminates whether the cells on the input cell highways $1_1$ are control cells or user cells, and output control cell dropping instruction signal $3_1$ when the cells are discriminated as control cells. Control cell dropper $4_1$ distributes the user cells onto the cell highways $5_1$ and the control cells onto the input control cell highway $6_1$. Control cell processing unit 8 performs a termination of the control cells and processes necessary operation ralating to the control cells. The control cells to be output are temporarily stored in the control cell FIFO $13_1$, and inserted into an idle cell position in the switch output cell highway $10_1$ when an idle cell is appeared. If no idle cell is available, the idle cell output instruction signal $14_1$ is provided to the ATM switch to stop user cell outputting and to output idle cells for sweeping out control cells stacked in the control cell FIFO $13_1$.

6 Claims, 6 Drawing Sheets

ATM CELL SWITCHING APPARATUS HAVING A CONTROL CELL BYPASS ROUTE

BACKGROUND OF THE INVENTION

1. Field of the Invention

The present invention relates to an ATM (Asynchronous Transfer Mode) cell switching apparatus, and, more particularly, to the ATM cell switching apparatus which provides a separated route bypassing an ATM switch for control cells, including information for signaling and OAM (Operation, Administration and Maintenance) purposes, from a route passing through the ATM switch for ordinary user cells, including information of user data, to minimize degradation of traffic characteristics of the user cells which would be influenced by the control cells flowing in a same route.

2. Description of the Related Art

In the ATM technology, any type of information such as voice, low speed data and high speed data like moving picture is divided into fixed lengths of data, which are called cells and transferred asynchronously in the ATM network. The information includes not only ordinary user data as described, but also includes control data such as signaling information for controlling establishment and disconnection of a path for the user cells and other OAM information for operation, administration and maintenance purposes of the ATM network system concerned.

The user cells are transferred between user terminals and transferred in the ATM network transparently. However, the control cells are processed at an ATM node like the ATM cell switching apparatus for controlling the ATM network system operation. It is preferable to create a path for the control cells separate from a path for the user cells in the ATM cell switching apparatus to avoid the control cells giving any influences to the user cell transferred and switched in the ATM cell switching apparatus.

Conventionally, there are several technical disclosures which provide a separate path without passing through the ATM switch for the purpose of separation of user cells and the control cells, or other purposes.

Figure 1A:
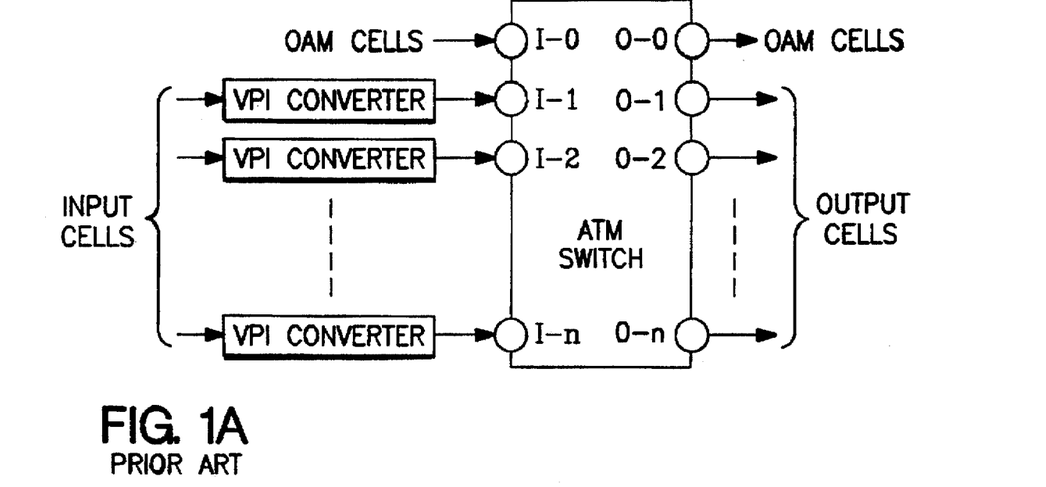
FIG. 1(A), 1(B) and 1(C) are schematic block diagrams showing an architecture and principle of conventional ATM cell switching apparatus having dedicated ports for control cells.
Figure 1B:
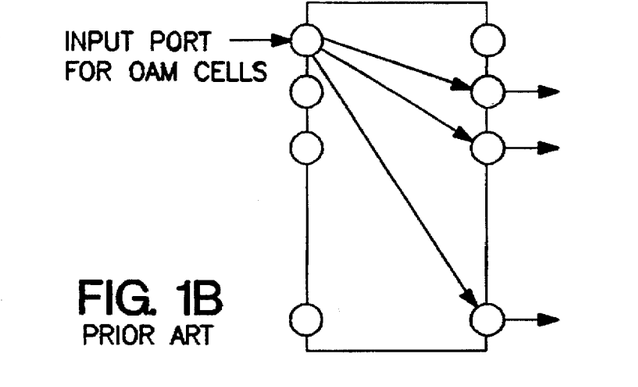
Figure 1C:
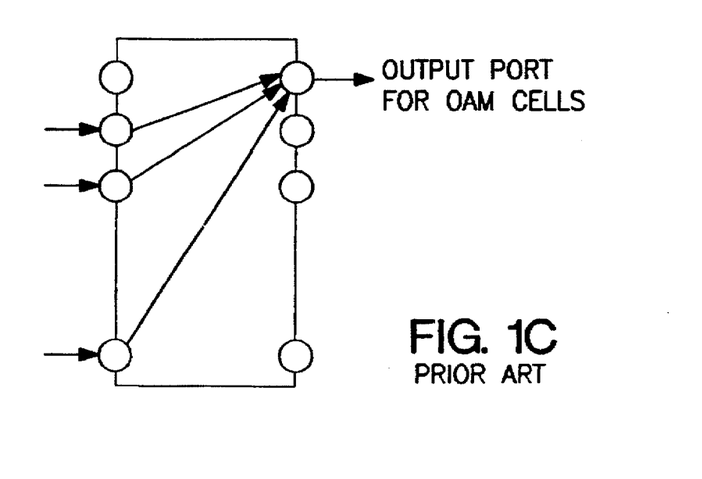

Japanese Patent Application Laid-open Publication No. Hei 4-310033 discloses a technology which provides dedicated ports for the control cells coming into the ATM switch and doing out from the ATM switch as shown in FIG. 1(A). In this disclosure, in order to perform processing of the control cells, a control cell processing circuit (not shown) or a control cell distribution/insertion circuit (not shown) is connected to the dedicated port of the ATM switch. The control cells coming into the ATM switch from the dedicated port I-0 are distributed to each of output ports through the ATM switch as shown in FIG. 1(B), and the control cells coming into the ATM switch from each of incoming ports are routed to the dedicated port O-0 for out going as shown in FIG. 1(C). In any case, in connection with the control cells, the control cells are subjected to be switched in the same manner as the user cells.

According to this technology, the dedicated port is occupied by the control cell processing circuit, so that it is not preferable because the number of effective highway in the ATM switch is decreased. Moreover, when the cell distribution/insertion circuit is connected to the dedicated port, there arises a problem that the quality of the user cell deteriorates when the speed of the control cell increases.

Figure 2:
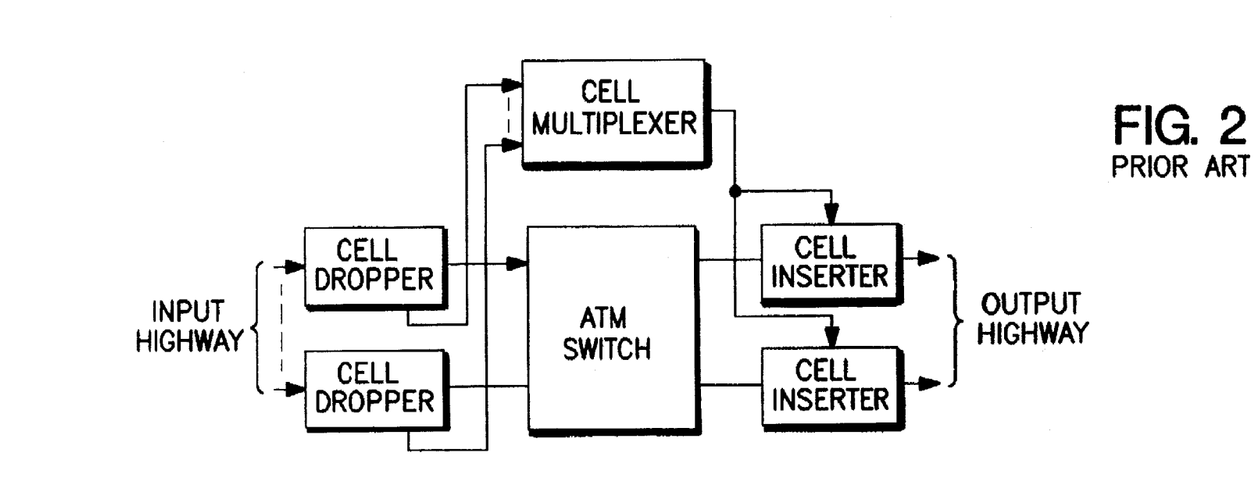
FIG. 2 is a schematic block diagram showing an architecture of conventional ATM cell switching apparatus having a bypass route for cells of a predetermined type of call.

Furthermore, Japanese Patent Application Laid-open Publication No. Hei 2-224548 teaches a provision of a separate path without passing through the ATM switch for user cells of a predetermined type of call which is considered as important as shown in FIG. 2. In this technology, the separate path is not provided for the control cell, and the separated path does not have a function for any processing of control cells.

Figure 3:
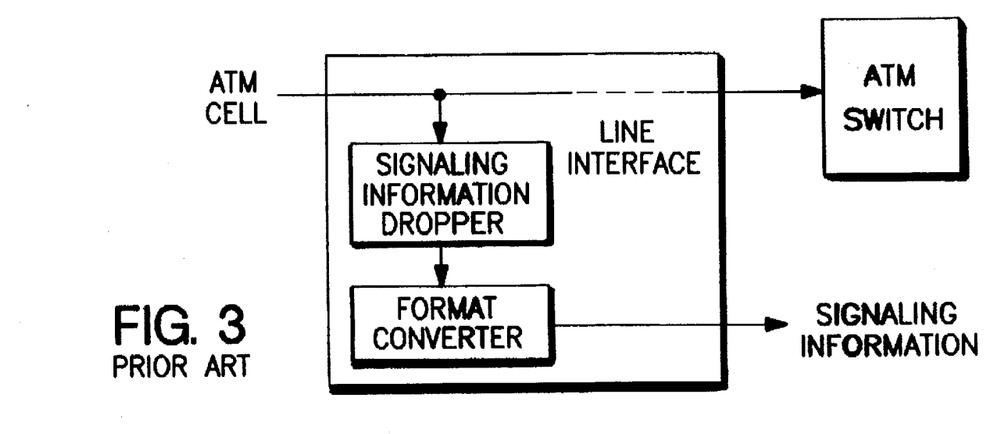
FIG. 3 is a schematic block diagram showing an architecture of conventional ATM cell switching apparatus having a separated path for incoming control cells.

Moreover, Japanese Patent Application Laid-open Publication No. Hei 5-48639 teaches that control cells coming from out side of the ATM switch are separated and format converted at a line interface unit, and transferred to a control cell processing unit through a different path from a path to the ATM switch as shown in FIG. 3. However, this technology teaches the processing of the received control cells only, and a relatively large amount of circuit unit is required as the line interface for each highway.

In any of the above-mentioned technologies, when the traffic amount of the control cell is increased during the switching operation at the ATM switch, it causes degradation of disposal quality of user cells (when requesting a call establishment, the user declares whether or not to permit disposal of cells, i.e. data, and the cell quality is determined by the degree of disposal) and delay quality (delay time of voice or moving picture from transmitting user terminal to receiving user terminal).

SUMMARY OF THE INVENTION

It is an object of the present invention to provide an ATM cell switching apparatus which serves to prevent degradation of user cells in the ATM switch and preserve the quality of control cells, even upon increase in the number of control cells.

An ATM cell switching apparatus, which includes an ATM switch for switching cells, a control cell processing unit for performing necessary operations in accordance with information contained in a control cell, a plurality of input cell highways and a plurality of output cell highways, each highway carrying mixed cells of user cells and control cells, such an ATM cell switching apparatus according to the present invention comprises:

input cell management means for discriminating a type of cell coming through the input cell highway, distributing user cells and control cells to the ATM switch and said control cell processing unit respectively; and output cell management means for discriminating an idle cell output from the ATM switch, inserting a control cell output from the control cell processing unit into a position of the discriminated idle cell, and outputting cells to the output cell highway.

User cells and control cells coming through the input cell highways are separated to the path to the ATM switch and to the path to the control cell processing unit respectively. Therefore, only user cells are switched in the ATM switch and they are not influenced by control cells. With respect to output cells, since output cells from the ATM switch contains user cells and idle cells depending on the amount of traffic offered to the apparatus, control cells to be output are inserted into those positions where idle cells are occupying.

An ATM cell switching apparatus according to the present invention further comprises control cell output management means for storing control cells output from the control cell processing unit, outputting stored control cells one by one in accordance with a control cell output instruction signal, which is generated when an idle cell being discriminated in cells output from the ATM switch, sent from the output cell management means.

Control cells output from the control cell processing unit are initially stored in the control cell output management means and wait for outputting in accordance with instructions from the output cell management means which finds out idle cell positions into which control cells are to be inserted.

An ATM cell switching apparatus according to the present invention further comprising:

first-output control means for monitoring the number of control cells stored in the control cell output management means, outputting a control signal indicating the number of control cells stored in the control cell output management means having reached a first predetermined number, and cutting off the control signal when the number of control cells stored in the control cell output management means have decreased to a second predetermined number; and second output control means being provided in the ATM switch for receiving the control signal output from the first output control means, stopping output user cells from being switched, and outputting idle cells instead of the user cells being stopped.

When the traffic volumes offered to the apparatus increases, the number of cells flowing through the apparatus also increases, and as the result, control cells to be output are stacked in the control cell output management means due to the shortage of idle cells. Therefore, countermeasures for this case have been taken by the first output control means and the second output control means, i.e. user cells are stopped for outputting and idle cells are output from the ATM switch forcibly when the number of control cells stored in the control cell output management means has reached to a predetermined being degraded.

DETAILED DESCRIPTION OF THE PREFERRED EMBODIMENTS

The present invention will be described in the following by referring to the attached drawings.

Figure 4:
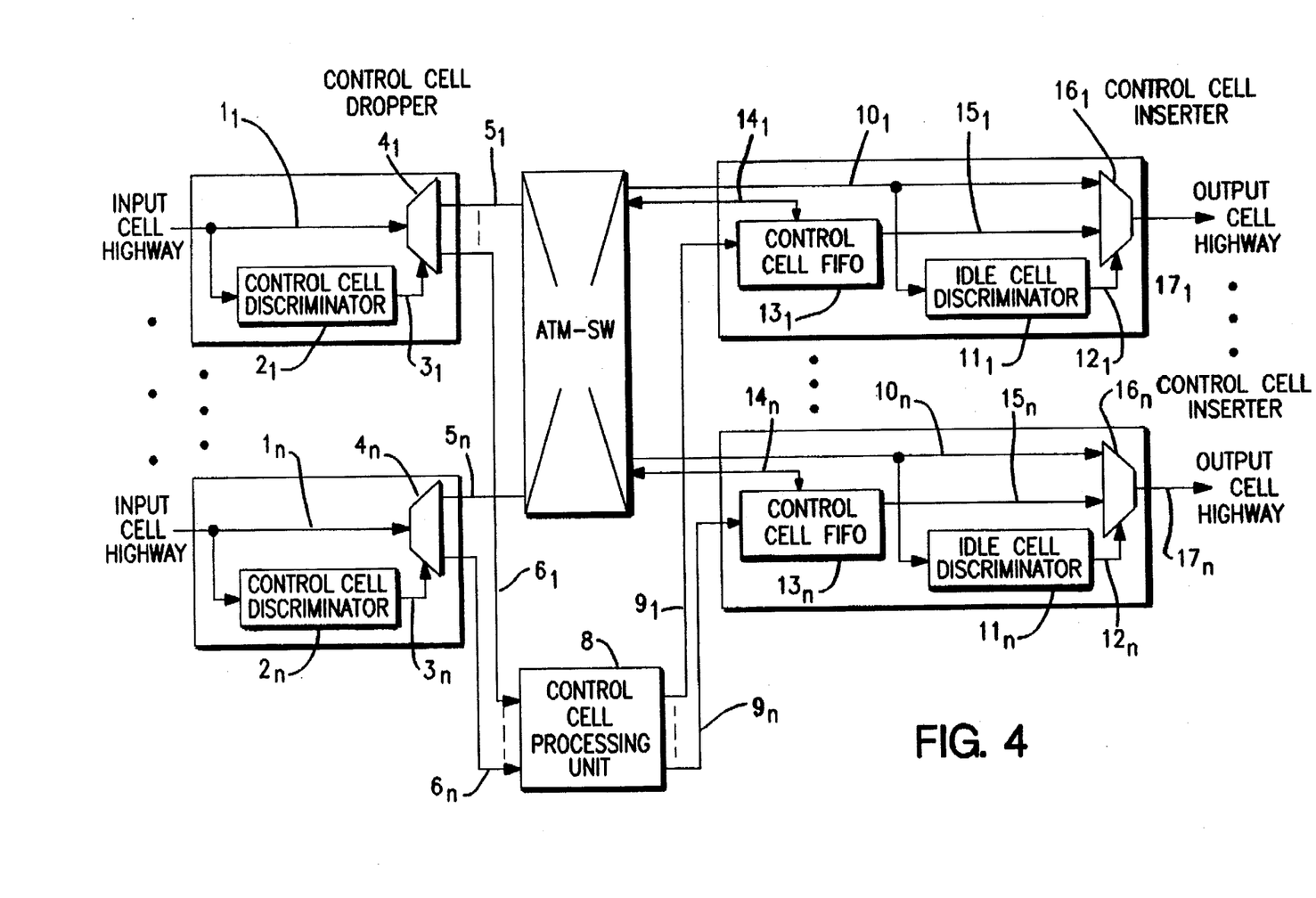
FIG. 4 is a schematic block diagram showing an architecture of the ATM cell switching apparatus according to one embodiment of the present invention.

The ATM cell switching apparatus according to the present embodiment is comprised of the following elements as shown in FIG. 4: input cell highways $1_1$ to $1_n$ of a number n, control; cell discriminators $2_1$ to $2_n$ of the number n, control cell droppers $4_1$ to $4_n$ of the number n, switch input cell highways $5_1$ to $5_n$ of the number n, input control cell highways $6_1$ to $6_n$ of the number n, an ATM switch 7, a control cell processing unit 8, output control cell highways $9_1$ to $9_n$ of the number n, switch output cell highways $10_1$ to $10_n$ of the number n, idle cell discriminators $11_1$ to $11_n$ of the number n, control cell FIFOs $13_1$ to $13_n$ of the number n, control cell inserters $16_1$ to $16_n$ of the number n, and output cell highways $17_1$ to $17_n$ of the number n.

In the input cell highways $1_1$ to $1_n$, there exist control cells and user cells in a mixed state. The control cell discriminators $2_1$ to $2_n$ discriminate whether the cell on the respective input cell highways $1_1$ to $1_n$ are control cells or user cells, and to output control cell dropping instruction signals $3_1$ to $3_n$ when the cells are discriminated to be control cellos. The control cell droppers $4_1$ to $4_n$ are responsive to the control cell dropping instruction signals, and drop the control cells to the input control cell highways $6_1$ to $6_n$. and The user cells are passed to the switch input cell highways $5_1$ to $5_n$.

The ATM switch 7 serves to perform the switching process and to output the user cells to the switch output cell highways $10_1$ to $10_n$. The control cell processing unit 8 terminates (receives and analyzes the contents of a received signal) the control cells on the input control cell highways $6_1$ to $6_n$ for processing, and outputs the control cells, as the result of the processing, to the output cell highways $9_1$ to $9_n$.

The control cell FIFOs $13_1$ to $13_n$ are provided with control cell FIFO monitoring circuits (not shown) and serve to temporarily store the control cells and to provide idle cell output instruction signals $14_1$ to $14_n$ to the ATM switch 7 when the storage amount reaches and exceeds a predetermined value. The idle cell discriminators $11_1$ to $11_n$ detect idle cells on the switch output cell highways $10_1$ to $10_n$ and output control cell insertion instruction signals $12_1$ to $12_n$. The control cell inserters $16_1$ to $16_n$ serve to insert, into idle cell portions of the switch output cell highways $10_1$ to $10_n$, the output control cells $15_1$ to $15_n$ which are the outputs of the control cell FIFOs $13_1$ to $13_n$, when the control cell insertion instruction signals $12_1$ to $12_n$ are provided to the control cell inserters $16_1$ $16_n$, and to supply output signals to the output cell highways $17_1$ to $17_n$.

When control cells for the call setting request or the like are coming into the input cell highways $1_1$ to $1_n$, they are discriminated by the control cell discriminators $2_1$ to $2_n$, dropped by the control cell droppers $4_1$ to $4_n$ into input control cell highways $6_1$ to $6_n$, and processed by the control cell processing unit 8.

Figure 5:
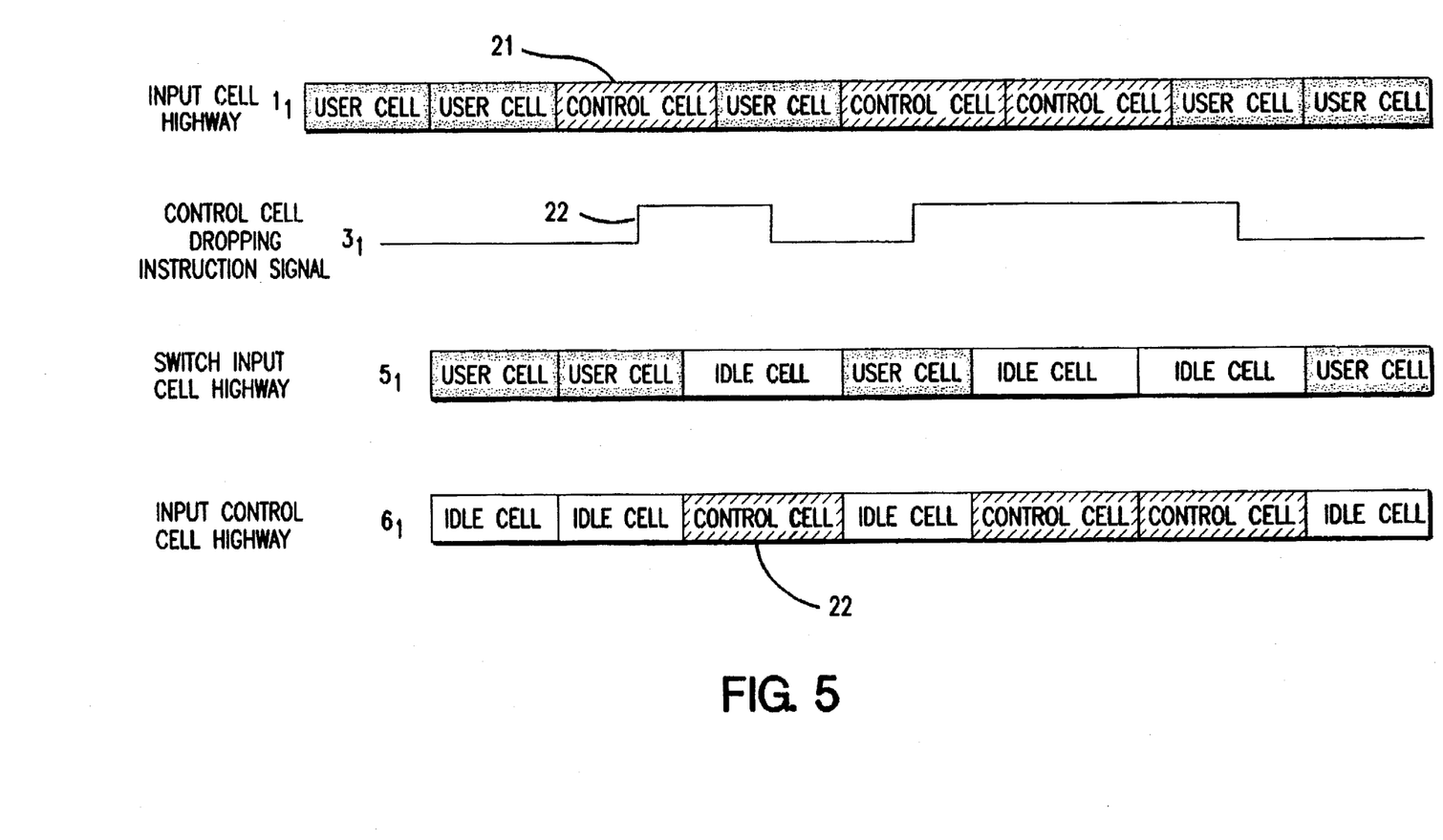
FIG. 5 is a view showing the manner in which the control cells on the input cell highways $1_1$ are dropped and distributed.

FIG. 5 is a view showing the manner how the control cells on the input cell highways $1_1$ is dropped and distributed. The control cell 21 on the input cell highway $1_1$ is discriminated by the control cell discriminator $2_1$. The control cell discriminator $2_1$ outputs a control cell dropping instruction signal 22, so that the control cell 21 is dropped by the control cell dropper $4_1$ as a control cell 23 of the input control highway $6_1$.

As a result of processing by the control cell processing unit 8, call setting or other operation related to the processed control cells are performed and output information related to the performed operation is output as the output control cell. The output control cell is temporarily stored in the control cell FIFO $13_1$. An idle cell on the switch output cell highways $10_1$ is detected by the idle cell discriminator $11_1$, and the output control cell $15_1$ stored in the control cell FIFO $13_1$ is inserted by the control cell inserter $16_1$ into the idle cell portion and output to the output cell highway $17_1$.

Figure 6:
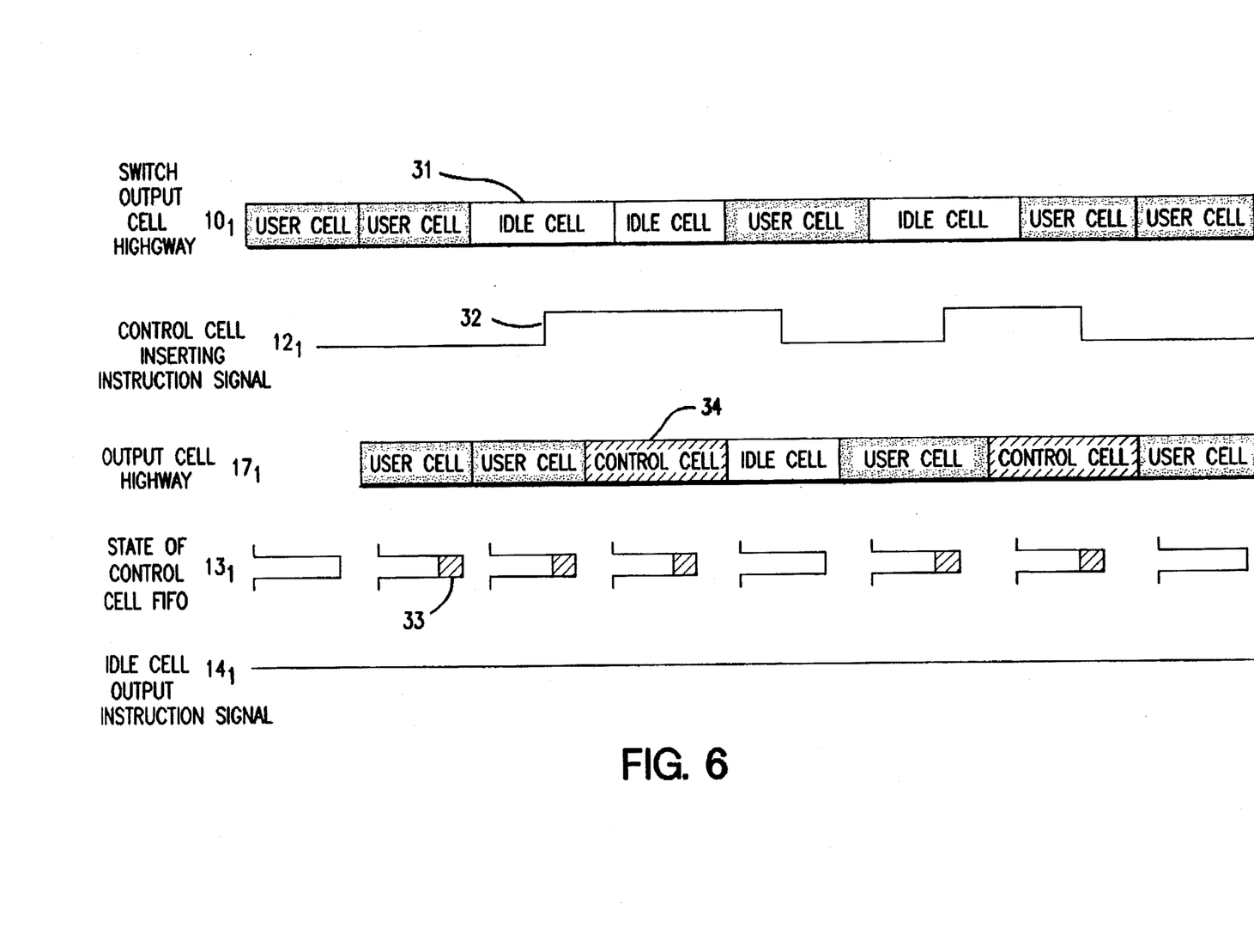
FIG. 6 is a view showing the control cells which are inserted into the output cell highway $17_1$ when idle cells are available for use.

FIG. 6 is a view showing the control cells which are inserted into the output cell highway $17_1$ when idle cells are available for use. When an idle cell 31 is available on the switch output cell highway $10_1$, a control cell inserting instruction signal 32 is provided to the control cell inserter $16_1$ and the output control cell 33 which is temporarily stored in the control cell FIFO $13_1$ is inserted as a control cell 34 on the output cell highway $17_1$.

When user cells exist continuously and there is no idle cell available on the switch output cell highway $10_1$, the output control cell is only stored in the control cell FIFO $13_1$ but the control cell cannot be output. However, when the number of cells stored in the control cell FIFO $13_1$ has reached at a predetermined level, an idle cell output instruction signal $14_1$ is transferred to the ATM switch 17 from a monitoring circuit of the control cell FIFO $13_1$ (not shown) so that the ATM switch 17 (by a control circuit of the ATM switch which is not shown) temporarily stops the output of the user cells and performs the output of the idle cells, whereby the control cell inserter $16_1$ is able to insert the output control cell into that idle cell portion to ensure the delay quality of the control cell.

Figure 7:
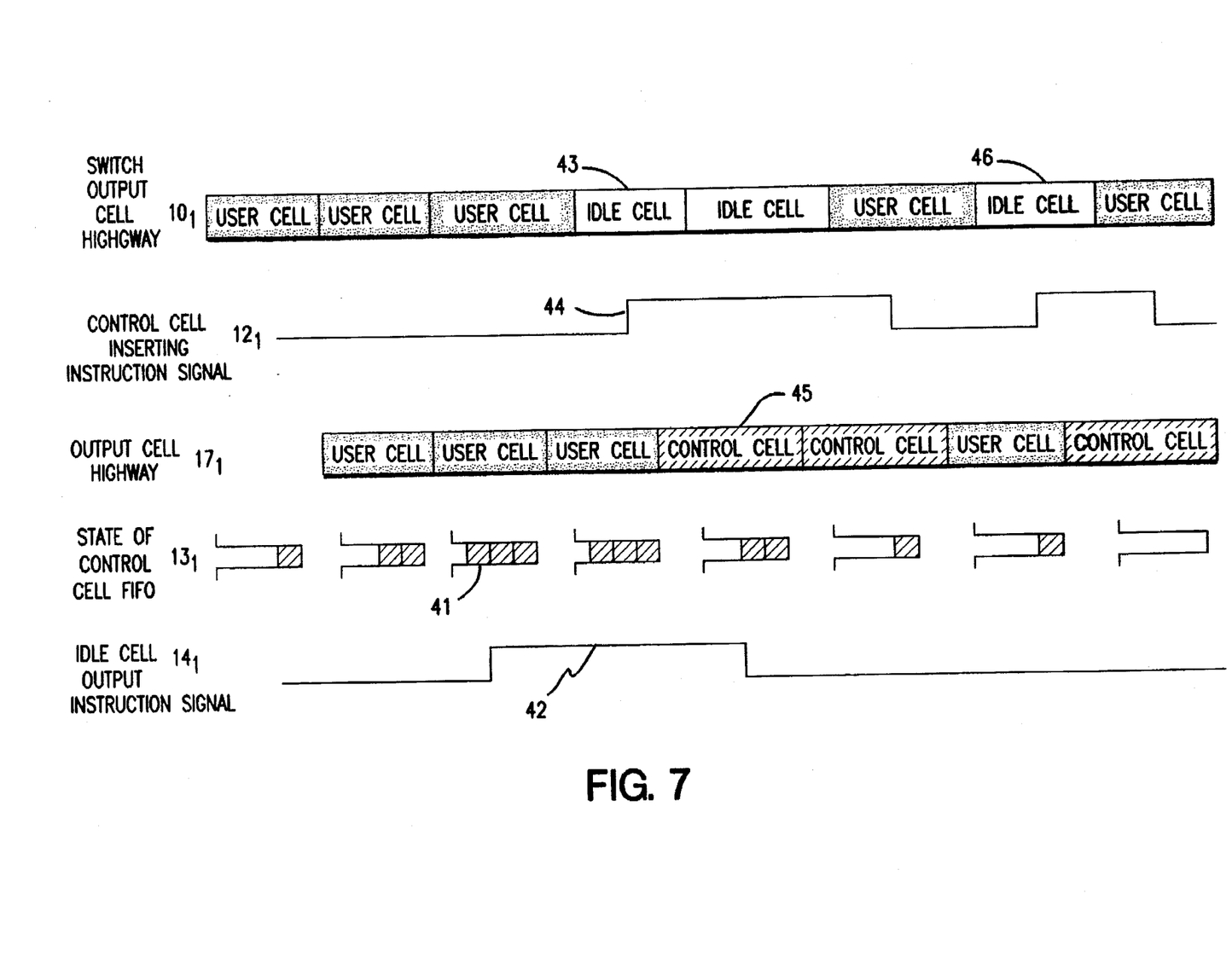
FIG. 7 is a view showing the control cells which are inserted into the output cell highway $17_1$ when an idle cell is not available for use.

FIG. 7 is a view showing the control cells which are inserted into the output cell highway $17_1$ when an idle cell is not available for use. When there is no idle cell available for use in the switch output cell highway $10_1$, the output control cells are stored in the control cell FIFO $13_1$. When the number of control cells 41 has exceeded a predetermined level, an idle cell output instruction signal 42 is provided to the ATM switch. The ATM switch which has received the idle cell output instruction signal 42 temporarily stops to output the user cells and transmits the idle cell 43. The idle cell discriminator $11_1$ which has detected the idle cell 43 outputs a control cell inserting instruction signal 44 so that the control cell inserter $16_1$ inserts the output control cell 45 stored in the control cell FIFO $13_1$ into the idle cell 43, and outputs it to the output cell highway $17_1$. Thereafter, when the storage amount of the control cell FIFO $13_1$ becomes lower than a threshold value, the idle cell output instruction signal $14_1$ is stopped and recovered to the normal state, e.g. the user cells are allowed to be output in the switch output cell highway $10_1$, and the output control cell stored in the control cell FIFO $13_1$ is output when an idle cell 46 is appeared in the switch output cell highway $10_1$ in a normal state.

As explained hereinabove, according to the present invention, the control cell to be processed by the ATM switch is dropped to the control cell processing unit without being passed through the ATM switch, and an idle cell output instruction signal is provided from the control cell FIFO in order to preserve the quality of the output control cells. Therefore, it becomes possible to prevent degradation of user cells in the ATM switch and preserve the quality of control cells, even upon increase in the number of control cells.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An ATM cell switching apparatus including an ATM switch for switching cells, a control cell processing unit for performing operations in accordance with information contained in a control cell, a plurality of input cell highways, and a plurality of output cell highways, each input cell highway of said plurality of input cell highways and each output cell highway of said plurality of output cell highways carrying mixed cells of user cells and control cells, said ATM cell switching apparatus comprising:

input cell management means for discriminating a type of cell coming through each said input cell highway, distributing user cells and control cells to said ATM switch and said control cell processing unit respectively; and output cell management means for discriminating an idle cell output from said ATM switch, inserting a control cell output from said control cell processing unit into a position of said discriminated idle cell, and outputting cells to each said output cell highway.

2. An ATM cell switching apparatus according to claim 1, further comprising:

control cell output management means for storing control cells output from said control cell processing unit, outputting stored control cells one by one in accordance with an output control cell insertion instruction signal sent from said output cell management means.

3. An ATM cell switching apparatus according to claim 2, wherein, said output control cell insertion instruction signal is generated when an idle cell is discriminated among cells output from said ATM switch at said output cell management means.

4. An ATM cell switching apparatus according to claim 2, further comprising:

first output control means for monitoring a number of control cells stored in said control cell output management means, for outputting a control signal indicating that said number of control cells stored in said control cell output management means has reached a first predetermined number, and for cutting off said control signal when said number of control cells stored in said control cell output management means has decreased to a second predetermined number; and second output control means provided in said ATM switch for receiving said control signal from said first output control means, for stopping output user cells from being switched, and for outputting idle cells instead of said user cells being stopped.

5. An ATM cell switching apparatus comprising:

a plurality of input cell highways;

a plurality of output cell highways, each highway of said plurality of input cell highways and each highway of said plurality of output cell highways carrying mixed user and control cells;

an ATM switch having a plurality of first input highways and a plurality of first output highways, said ATM switch having switching cells input through said plurality of first input highways and output through said plurality of first output highways;

each one of said plurality of input cell highways being coupled to a respective control cell discriminator, said respective control cell discriminator discriminating control cells and outputting a control cell dropping instruction signal when one of said control cells is discriminated;

a control cell processing unit having a plurality of second input highways and a plurality of second output highways, said control cell processing unit receiving and analyzing control cells input through said plurality of second input highways, processing operations relating to said control cells, and outputting control cells to said plurality of second output highways;

each one of said plurality of input cell highways and each respective control cell discriminator being connected to a respective control cell dropper, said respective control cell dropper outputting said user cells to one of said plurality of first input highways connected to said ATM switch, and when said control cell dropping instruction signal is received, outputting said control cells to one of said plurality of second input highways connected to said control cell processing unit;

each one of said plurality of first output highways from said ATM switch being coupled to a respective idle cell discriminator, said respective idle cell discriminator monitoring cells coming through said one of said plurality of first output highways, discriminating an idle cell, and outputting a control cell inserting instruction signal when said idle cell is discriminated; and each one of said plurality of first output highways from the ATM switch, each one of said plurality of second output highways from said control cell processing unit and said respective idle cell discriminator being connected to a respective control cell inserter, said respective control cell inserter inserting a control cell coming through said one of said plurality of second output highways into an idle cell position in said one of said plurality of first output highways in accordance with said control cell inserting instruction signal, and outputting said mixed cells to a respective highway of said plurality of output cell highways.

6. An ATM cell switching apparatus according to claim 5, wherein:

each one of said plurality of second output highways connected to a respective control cell storage memory, said respective control cell storage memory storing control cells output from said control cell processing unit, outputting stored control cells to said control cells to said respective control cell inserter one by one in accordance with said control cell inserting instruction signal, said respective control cell inserter having received said control cell instruction signal sent from said respective idle cell discriminator;

a respective output monitoring circuit for monitoring a number of control cells stored in said respective control cell storage memory, for outputting a control signal indicating that said number of control cells stored in said respective control cell storage memory has reached a first predetermined number, and for cutting off said control signal when said number of control cells stored in said respective control cell storage memory has decreased to a second predetermined number; and a respective cell output control circuit provided in said ATM switch for receiving said control signal from said respective output monitoring circuit, for stopping output user cells from being switched, and for outputting idle cells instead of said user cells.

\* \* \* \* \*